United States Patent [19]

Gregg

[11] Patent Number: 4,625,853
[45] Date of Patent: Dec. 2, 1986

[54] APPARATUS FOR THE TRANSPORT OF WORKPIECES TO AND FROM A MACHINE TOOL

[75] Inventor: Hans Gregg, Woerthsee/Steinebach, Fed. Rep. of Germany

[73] Assignee: Carl Hurth Maschinen- und Zahnradfabrik GmbH & Co., Munich, Fed. Rep. of Germany

[21] Appl. No.: 705,767

[22] Filed: Feb. 26, 1985

[30] Foreign Application Priority Data

Mar. 14, 1984 [DE] Fed. Rep. of Germany ....... 3409302

[51] Int. Cl.⁴ .............................................. B65G 15/64
[52] U.S. Cl. ................... 198/345; 198/861.1; 409/6
[58] Field of Search ..................... 198/345, 839, 861.1, 198/861.2, 339.1, 561, 468.6; 409/6; 51/215 E, 215 M, DIG. 1, DIG. 15

[56] References Cited

U.S. PATENT DOCUMENTS

| 2,961,729 | 11/1960 | Colliva | 198/468.6 |
| 3,149,533 | 9/1964 | Gluck | 409/6 |
| 4,051,775 | 10/1977 | Watson | 198/488 |
| 4,106,632 | 8/1978 | Bossi | 198/468.6 |

FOREIGN PATENT DOCUMENTS

| 216804 | 4/1958 | Australia | 198/861.2 |
| 2713887 | 10/1977 | Fed. Rep. of Germany. | |
| 8208343 | 8/1982 | Fed. Rep. of Germany. | |
| 45-15770 | 6/1970 | Japan | 198/839 |

Primary Examiner—Joseph E. Valenza
Assistant Examiner—Daniel R. Alexander
Attorney, Agent, or Firm—Flynn, Thiel, Boutell & Tanis

[57] ABSTRACT

An apparatus for the transport of rollable workpieces, in particular gears, with a conveyor chain which extends over two return points, on the upper reach of which chain the workpieces rest or roll. Between two horizontal sections of the upper chain reach, which sections lie in different planes, there is provided an inclined section, in the area of which lies the clamping and machining station of a machine tool, to which roll the workpieces. The inclination of this section is changeable by means of a rocker arm, in order to be able to adjust the distance between the clamping device and the conveyor chain to various workpiece dimensions.

6 Claims, 7 Drawing Figures

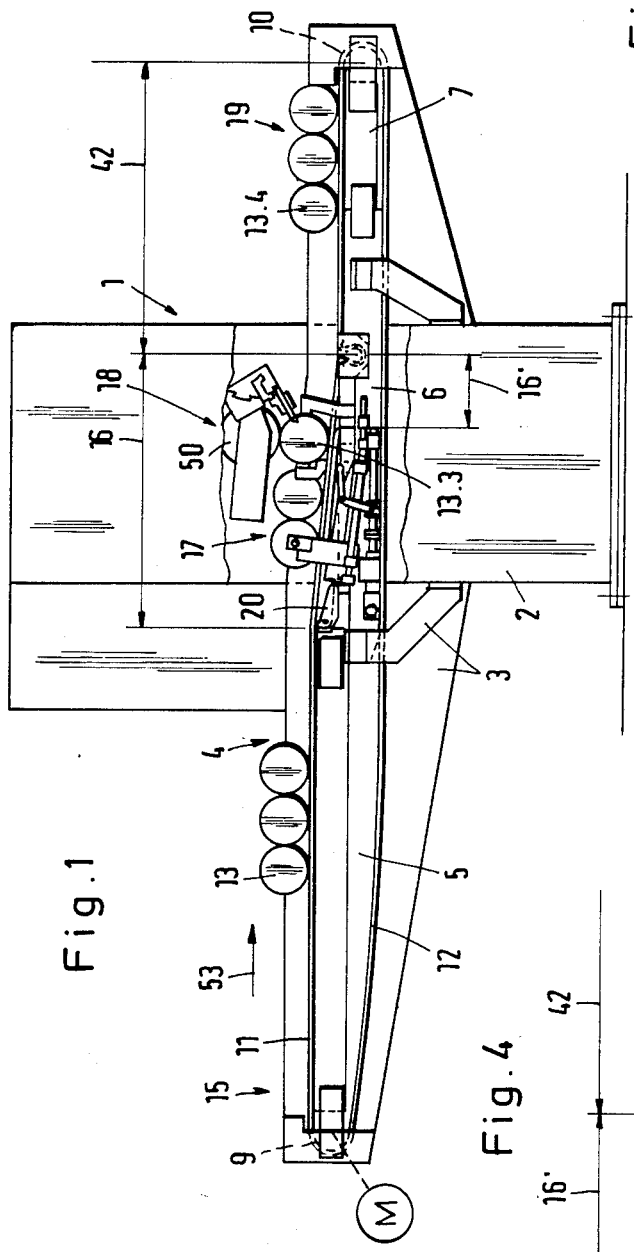
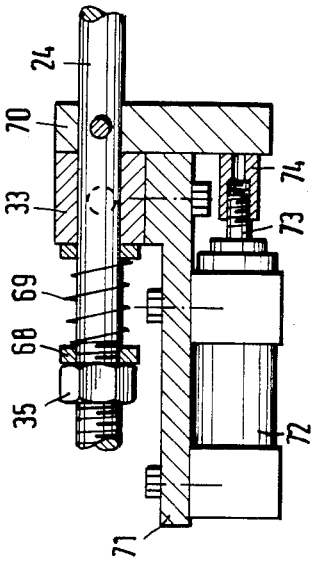
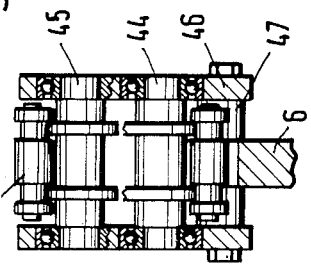
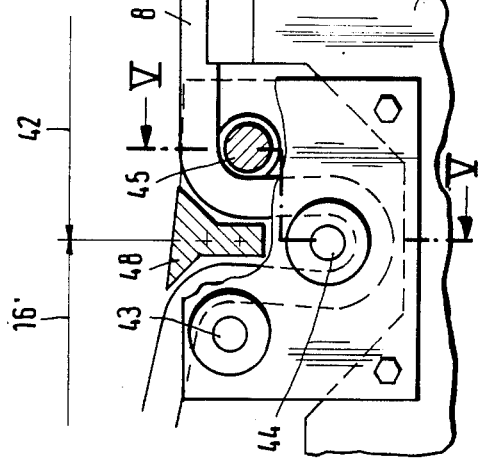

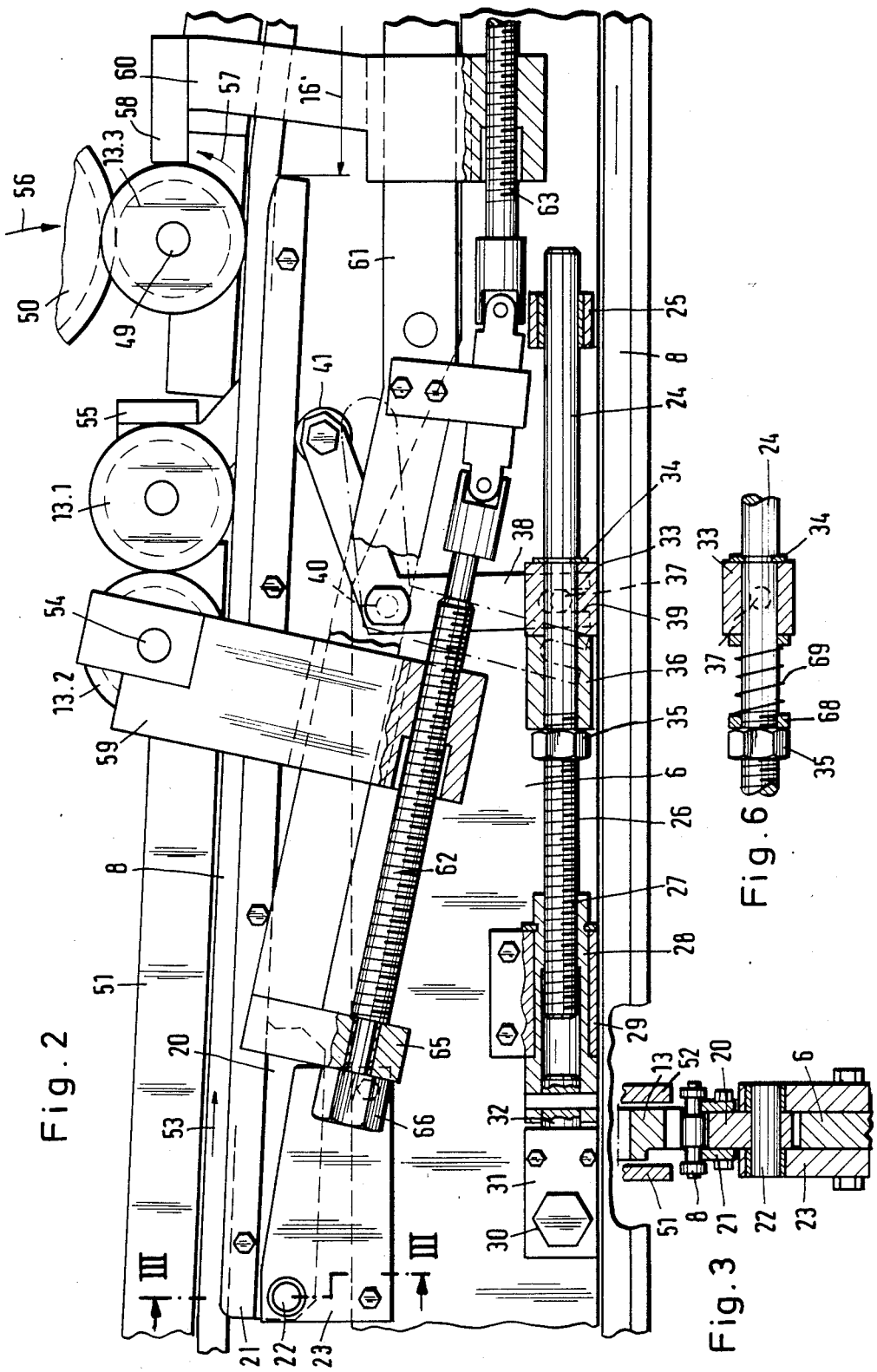

APPARATUS FOR THE TRANSPORT OF WORKPIECES TO AND FROM A MACHINE TOOL

FIELD OF THE INVENTION

The invention relates to an apparatus for the transport of workpieces to a work station and, more particularly, to a structure for moving the workpiece support away from the workpiece during the machining process.

BACKGROUND OF THE INVENTION

Workpieces are transported on such apparatus either lying directly on the chain or on pallets which are supported on the chain. A changing over of such apparatus to different workpieces is very expensive and in many cases not at all possible. If the workpiece transport occurs by means of pallets, the pallets must be replaced with ones which will accommodate workpieces of different dimensions. If the workpieces are transported lying directly on the chain, the entire apparatus would have to be placed higher or lower in order to bring the workpieces into the correct elevational position at the working station, however, then the associated loading and unloading devices, magazines, etc. will no longer fit.

Therefore, the basic purpose of the invention is to provide a workpiece transport apparatus which can be changed over by simple means. The apparatus is specifically adapted for a problemless transport of rollable parts, in particular gears.

The purpose is inventively attained by a transporting device which can be adjusted within the adjustably inclined central section of the chain to the many different workpiece dimensions, in particular outside diameter, so that the workpieces are always supplied at the level which is correct for facilitating a clamping of the workpiece in the machine. The loading station with the first section of the chain and the last section of the chain with the discharge station remain unchanged at the same level and thus in a position which is adjusted to the feeding and discharge devices.

The apparatus is very well suited for the transport of rollable gears which, standing with two teeth on the chain, are moved by the chain on the horizontal sections of the conveying route, however, on the inclined section roll on the chain driven by the effect of gravity thereon. An important advantage compared with a transport of pallets is the fact that the feeding of the workpieces from one stop area to the working station just like the moving of the workpieces away from the working station occurs very quickly, since no frictional forces must be overcome. Compared with a chain which extends horizontally over the entire length, the inclination of the conveying route in the area of the working station in addition brings the advantage that the workpieces can roll freely and are not forced into a "backward rotation" by the chain.

In order to be able to adjust the inclination and thus the distance between the chain and the clamping devices in the working station, the apparatus is further developed wherein a rocker arm is supported for pivotal movement and allows the chain supporting the workpieces to be adjusted toward or away from the tool of the machine.

A development of a chain support causing the chain to form a U is advantageous at the transition of the chain from the inclined section to the second horizontal section. With this it is assured that the chain will not lift off the chain guides in this area and that the workpieces which roll away from the working station do not get caught in the gap between the chain section which extends downwardly over the first guide roller and the chain section which leads upwardly over the last guide roller.

In particular when the apparatus is used for the transport of gears, it is desirable for example, to provide structure for ensuring a satisfactory meshing of the workpiece and tool tooth systems and/or avoiding any damages to the workpiece and the tool.

BRIEF DESCRIPTION OF THE DRAWINGS

The invention will be described herein below with reference to one exemplary embodiment, which is illustrated in seven figures. More specifically:

FIG. 1 illustrates a machine tool in connection with the inventive apparatus;

FIG. 2 illustrates a view of the rocker arm and its adjusting device;

FIG. 3 is a cross-sectional view of the rocker arm taken along the line III—III;

FIG. 4 illustrates the chain deflection at the end of the inclined section of the conveying route;

FIG. 5 is a cross-sectional view of the chain deflection taken along the line V—V;

FIGS. 6 and 7 illustrate two modifications for the adjusting device of the rocker arm.

DETAILED DESCRIPTION

A frame 3 for a workpiece-transporting apparatus 4 is secured, for example by bolts, to the column 2 of a machine tool 1 (a gear-deburring machine being schematically illustrated in FIG. 1). The frame 3 is composed of suitable profiled parts and has a longitudinal support which is composed of flat profiles 5, 6 and 7. Sprocket wheels are rotatably mounted at opposite ends of the profiles 5 and 7. An endless conveyor chain 8 extends around the sprockets. The chain extends through a 180° angle at each of the sprocket wheels, so that an upper chain reach 11 and a lower chain reach 12 is provided between the return points 9 and 10 (whereat the sprockets are provided). To drive the conveyor chain, one of the two sprocket wheels is drivingly coupled to a motor M (FIG. 1). Furthermore, a conventional and therefore also not illustrated device for tensioning the chain is provided.

The workpieces, for example gears 13, which are to be transported, rest freely on the upper chain reach 11 and move with the constantly moving chain due to their own weight thereon. They are moved manually or by a mechical device at a loading station 15 onto the conveyor chain 8. A separating device 17, which works in response to a control of the machine tool 1, assures that only one gear 13.3 reaches a working station 18, where it is clamped, machined and again released. Then the machined gear 13.4 is transported to a discharge station 19 and is there held until it is removed manually or by a mechanical device.

The conveying route which is formed by the conveyor chain 8 extends from the first return point 9 first horizontally and then becomes inclined downwardly to a working station 18 and slightly therebeyond before it extends again horizontally to the second return point 10. Thus the return point 9 lies higher than the return point 10. On the central inclined section 16, the chain is guided over a rocker arm 20 (FIG. 2), which for this purpose is provided with lateral guide bars 21. The rocker arm 20 is swingably mounted on two plates 23 by a bolt 22 (FIG. 3). The plates 23 are secured to the flat profile 6. To adjust the transporting apparatus 4 to different workpiece diameters, it is possible to change the inclination of the rocker arm 20 and thus the distance of the chain 8 from the not changeable axle 49 of the not illustrated clamping device at the working station 18. The apparatus which will be described hereinbelow is used for this.

A rod 24 is supported for longitudinal movement at one end in a bearing block 25 which is mounted on the frame 3 or on the flat profile 6. The other end of the rod has an external thread 26 thereon received in an internally threaded portion 27 of a spindle 28. The spindle 28 is rotatably supported in a bearing block 29 mounted on the profile 6. The spindle 28, which is coupled to a driven shaft 32 of a beveled gearing or a right angle drive 31, can be driven by a crank (not illustrated) mounted on the drive shaft of the bevel gearing or right angle drive 31, which drive shaft is provided with a hexagonal profile 30. The rod 24 and with it a nonrotatable cam 33 are thereby rendered shiftable back and forth. The cam 33 is together with a rigid sleeve 36 clamped between a stop 34 and a nut 35. The cam 33 includes a pin 37 received into a slot 39 in an arm of a two-arm lever 38. The lever 38 is pivotally supported on a bolt 40 on the frame 3 or on the flat profile 6 and is provided at the end of its other arm with a rotatable roller 41. The free end of the rocker arm 20, specifically the under side of the guide bar 27 rests on the roller 41.

If the rod 24 is now moved to the left in FIG. 2, then the lever 38 is rotated simultaneously, for example into the position which is illustrated in dash-dotted lines. The rocker arm 20 is thereby lowered at the same time, so that larger gears 13 can be clamped and machined. Depending on the inclination of the rocker arm 20, the inclination of the conveyor chain 8 changes also in the section 16' between the end of the rocker arm 20 and the start of the second horizontal section 42 of the conveying route. In order to prevent a lifting off of the chain 8 at the transition point to the section 42, the chain is guided over three guide rollers 43, 44 and 45 (FIGS. 4 and 5) which cause the chain to travel through a U-shaped bend. All three guide rollers 43, 44 and 45 are supported below the actual transporting route between bearing plates 46 secured with corresponding spacers 47 to the frame 3 or the flat profile 6. The periphery of the guide roller 45 lies at the same level as the sprocket wheel at the return point 10. In order that the machined workpieces can be assuredly guided over the gap between the legs of the U formed by the chain between the first and the third roller 43 and 45, a transition piece 48, which is secured between the bearing plates 46, is provided.

In order for the workpieces (gears 13) to remain aligned on the chain 8, guideways 51 and 52 are mounted on both sides, which in the area of the separating device and at the working station have recesses for the associated apparatus. The guideway 52 is left out in FIG. 2 for clarity purposes.

The workpieces (gears 13) which move in the conveying direction 53 from the working station roll on the inclined section 16 of the conveyor chain 8 to the separating device 17. Here the first arriving gear 13.1 is stopped at a stop 55, the next gear 13.2 stops at the gear 13.1 and a pin 54 is swung into its bore. Another gear 13.3 had already arrived earlier at the working station 18, where it was stopped by a stop 58. During the machining process, the gear 13.3 is received and clamped by a not illustrated clamping device, whereby it is lifted a small distance off from the conveyor chain. The tool 50, for example a deburring gear, is simultaneously swung in direction of the arrow 56 into the tooth system of the gear 13.3 and is then rotated: the gear 13.3 is machined. The tool 50 is subsequently stopped and swung out and the gear 13.3 is released from the clamping device, namely it rests again on the chain 8 and against the stop 58. Thereafter, the stop 58 is swung away so that the gear 13.3 can roll away. Due to the inclination of the conveyor chain 8, a rolling away of the gear 13.3 is possible without any delay. A delay would occur with a horizontal conveyor chain at the working station because of the "backward rotation" which would then be forced upon the gear 13.3. Simultaneously with the stop 55 the pin 54 is swung out, which, however, because of the presence of the gear 13.1 has no effect. (Only if the gear 13.1 for any kind of a reason would not as yet or no longer be at the stop 55, the gear 13.2 would now roll to the stop.) As soon as the stop 58 and the pin 54 are again swung in, the stop 55 is swung out and the gear 13.1 rolls on to the working station. During the machining of this gear, the stop 55 is again swung back and the pin 54 and the stop 58 are swung out, so that the gear 13.2 can follow by rolling up to the stop 55 and a possibly further gear can follow, into the bore of which is received the pin 54. The possibly further gear can, when it arrives only later at the separating device, also rest on the pin 54 and be permitted to roll on to the position of the gear 13.2 only during a release of the machined gear 13.1.

The pin 54 and the stop 58 are guided on arms 59 and 60 movably mounted on a rail 61 for the purpose of adjusting to different workpiece diameters. Each arm 59 and 60 is for this purpose threadedly engaged with one of two threaded spindles 62 and 63 connected together through a universal joint 64. One end of each spindle is supported in a bearing block, of which one is illustrated and is identified by the reference numeral 65. A hexagonal profile 66 is connected to one end of the threaded spindle 62, onto which profile 66 can be mounted a crank. By rotating the crank and thus the threaded spindles 62 and 63, which have opposite handed threads thereon, the arms are moved toward one another (for smaller workpiece diameters) or away from one another (for larger workpiece diameters). Since the workpiece radius is the spacing between the stationary axle 49 of the clamping device and the stop 58 and since the spacing between the axis of the pin 54 and the stationary stop 55 is, however, three times that of first mentioned spacing, the pitch of the thread of the spindle 62 is three times as large as the one of the spindle 63. The devices for swinging the stops 55 and 58 and the pin 54 in and out are well known in the art and are, therefore, not described and not illustrated. p If the workpiece-transporting device is utilized in a machine tool in which gears 13 must mesh at the working station with a gearlike tool, for example in a shaving machine, it can then be advantageous to resiliently support the rocker arm 20 in order to avoid any damage to the teeth during the initially occurring meshing of the teeth (tooth-before-tooth-position). An example for this is illustrated in FIG. 6. With an otherwise identical construction as aforedescribed, the sleeve 36 is replaced with a compression spring 69 which is arranged between two disks 68. The force of the spring 69 is sufficient in order to move, during the movement of the rod 24, the lever 38 and thus the rocker arm 20 into the necessary position. Upon the occurrence of particularly high pressure loads, the rocker arm 20 can yield downwardly against the force of the spring 69, so that a forcing of the teeth is prevented.

If in construction of the tool it is not possible in such machines to lift the workpiece to be machined (gear 13.3) during clamping a small distance off from the conveyor chain 8, then it is advisable to lower the chain 8 following a clamping of the workpiece during the machining task. An example for this is illustrated in FIG. 7. A plate 70, which is fixedly connected to the rod 24, serves as a stop for the cam 33. Opposite from the plate 70 there are arranged as before the nut 35 and the spring 69 with the plates 68. A plate 71 is secured to the cam 33 and supports a hydraulic cylinder 72. The piston rod 73 of the cylinder 72 is secured to a balancing piece 74 as by a threaded connection, provided on the plate 70. If now the hydraulic cylinder 72 is loaded with pressure, then it urges—since the piston rod 73 rests with the balancing piece 74 on the plate 70—itself and thus through the plate 71 the cam 33 to the right as shown in FIG. 7, without causing a change in the position of the rod 24. The lever 38 is thereby, however, also turned and the rocker arm 20 is lowered. Upon a switching off of the pressure all parts again assume their earlier position because of the force of the spring 69.

The changes to the length of the conveyor chain 8, which changes result from the change of the inclination in the section 16, be it through an adjusting of the rocker arm because of other workpiece dimensions, be it because of a lowering of the rocker arm in order to space the conveyor chain from the workpiece to be worked, are very small. The tension on the chain can be adjusted without any further devices by the above-mentioned structure supporting the conveyor chain, especially since the lower chain reach due to its own weight sags slightly at any rate.

The embodiments of the invention in which an exclusive property or privilege is claimed are defined as follows:

1. An apparatus for the transport of workpieces from a loading station through a working station to an unloading station, comprising at least one endless and movably supported conveyor chain guided before the loading station and after the unloading station over sprocket wheels with horizontal axes, said axes being supported in a frame and of which one of two return points for said chain is driven rotatinglys by a motor, wherein a conveying route is formed by an upper reach of said conveyor chain, viewed in the conveying direction, starting out from said one return point extends first horizontally, then downwardly inclined from a point before the working station to a point beyond the working station and thereafter horizontally again to the other return point, so that the two return points have different elevational positions in the frame, and means for varying the inclination between the first horizontal section and the working station, said means including a rocker arm extending from adjacent the downstream end of the first horizontal section to at least the working station and supporting said conveyor chain, said rocker arm at its end which is adjacent the first horizontal section being pivotally adjustable about a horizonal axis which extends transversely with respect to the conveying direction, and further means for facilitating a resiliently downwardly swinging away of said rocker arm under the action of a force which is created during a clamping of the workpiece in the working station.

2. The apparatus according to claim 1, wherein it is used for the transport of rollable gears, which are rollingly moved by gravity on the inclined section of the conveying route and which are fed by gravity to the working station.

3. The apparatus according to claim 1, wherein said conveyor chain at the transition from the inclined to the second horizontal section of the conveying route forms an open loop, whereat it is guided over guide rollers which are arranged below the conveying route, the last guide roller of which lies with its periphery at the same level as the sprocket wheel of the second return point.

4. The apparatus according to claim 3, wherein in the gap which exits between the first and the last guide roller there is arranged rigidly a transition piece, the upper edge of which lies at least approximately at the level of the conveying route.

5. The apparatus according to claim 1, wherein said further means further facilitates a downward swinging of the rocker arm during the clamping and/or machining of the workpiece in the working station away from its adjusted position.

6. The apparatus according to claim 1, wherein a separating and/or stopping device before said working station is provided to control the movement of said workpieces to said working station.

* * * * *